United States Patent [19]
Wrzesien et al.

[11] 3,971,669
[45] July 27, 1976

[54] CARBON FIBER COMPOSITES

[75] Inventors: Andrew Peter Wrzesien, Cheadle Hulme; Ian Whitney, Wirksworth; Joseph Katona, Manchester, all of England

[73] Assignee: Hyfil Limited, England

[22] Filed: July 17, 1973

[21] Appl. No.: 379,913

[30] Foreign Application Priority Data
July 21, 1972 United Kingdom............... 34114/72

[52] U.S. Cl.................................... 156/181; 8/140; 28/72.2 R; 156/148; 156/315; 264/29.2; 427/227; 427/412; 428/367; 428/902
[51] Int. Cl.²...................... B29H 9/04; D04H 3/08
[58] Field of Search........... 156/148, 180, 181, 306, 156/315; 28/72.2 R; 8/140; 161/154, 155; 264/29; 117/46 CC; 428/367, 902; 427/412, 227, 226, 228

[56] References Cited
UNITED STATES PATENTS
3,042,569 7/1962 Paul.................................. 156/441

Primary Examiner—Douglas J. Drummond
Assistant Examiner—J. J. Gallagher
Attorney, Agent, or Firm—Oblon, Fisher, Spivak, McClelland & Maier

[57] ABSTRACT

Disclosed is a method of producing a carbon fiber felt which includes the steps of preparing a substantially unidirectional array of continuous carbonizable filaments in oxidized state, cross-laying other such filaments on one side of said array in a state of restraint from displacement from their cross-laid relationship, and needle-punching the resulting assembly from the same side.

Also disclosed is a method of pre-sizing a high bulk, low density carbon fiber felt comprising the steps of impregnating said felt with a thermoplastic or thermosetting resin highly diluted in a solvent, and removing said solvent either before or while the assembly is being reduced to its final dimensions to leave the resin per se as a coating on the fibrous material serving to adhere individual elements together at cross-over points to prevent displacement thereof, all prior to the addition of the matrix material in which the carbon fiber is embedded to form the final composite. The disclosure also embraces felts made by such methods and incorporated in composites.

5 Claims, 8 Drawing Figures

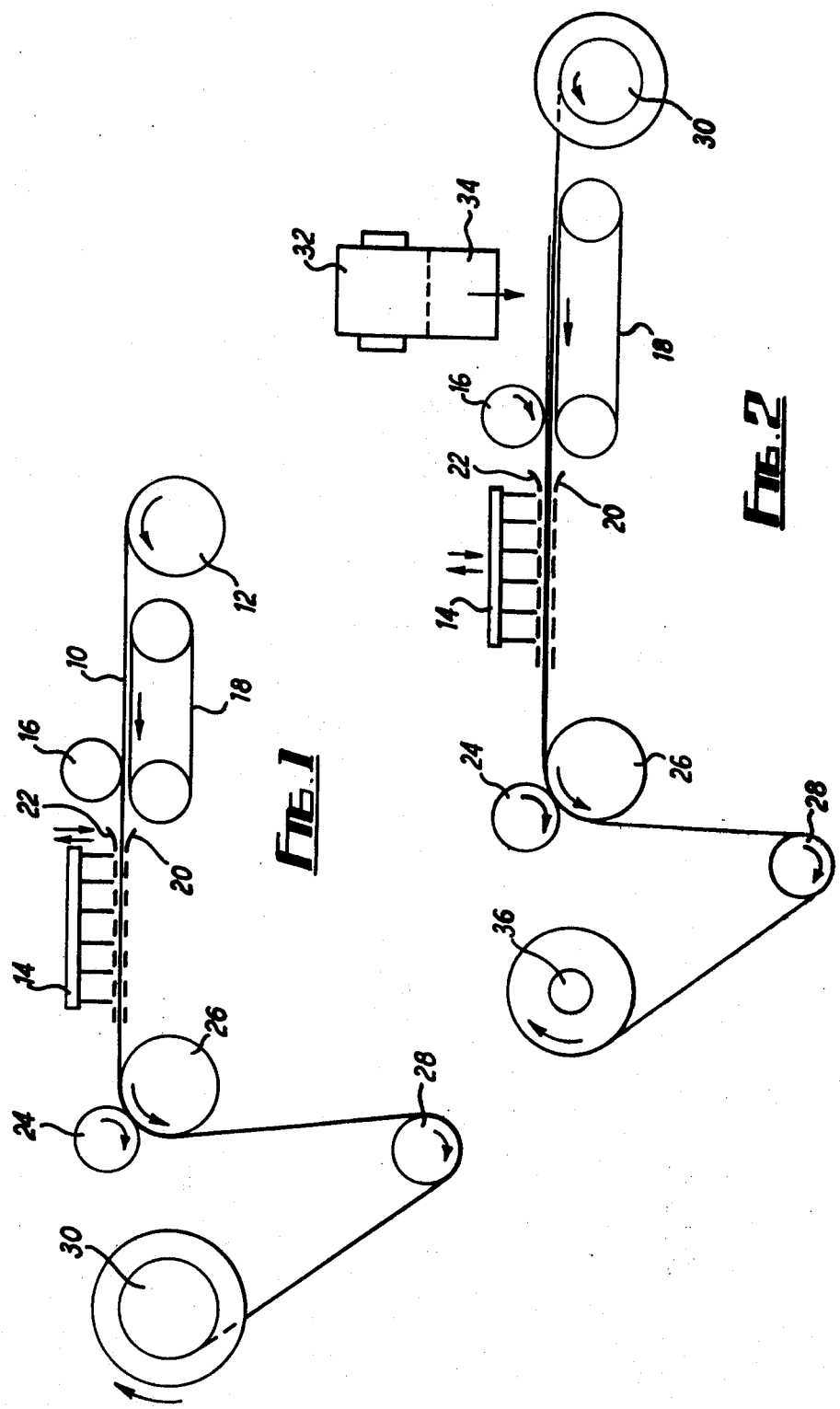

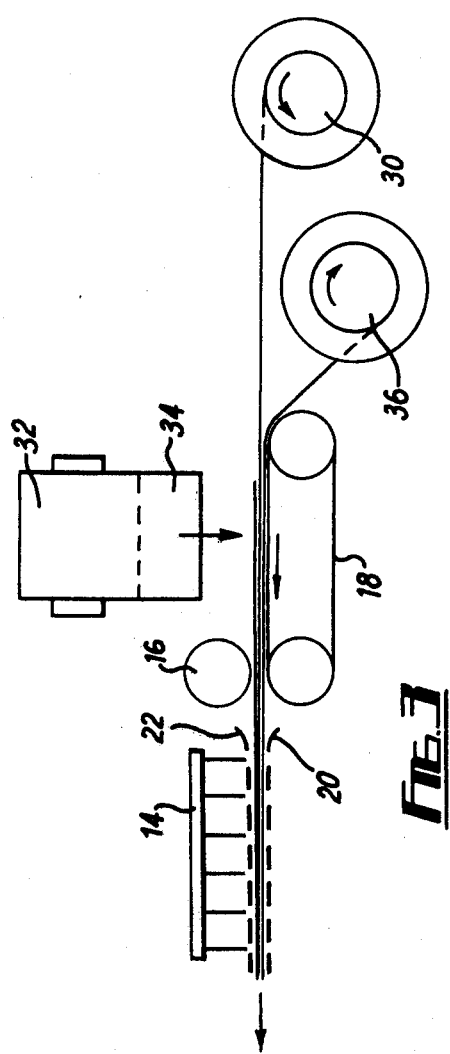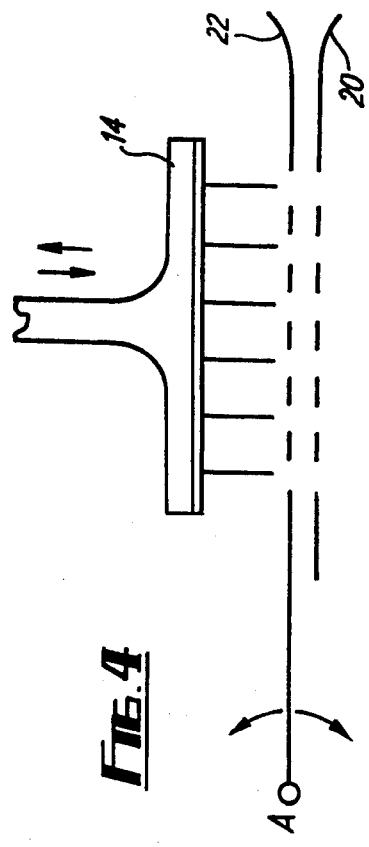
FIG. 3
FIG. 4

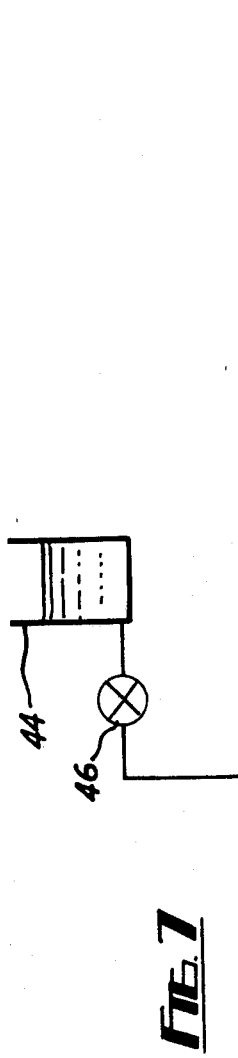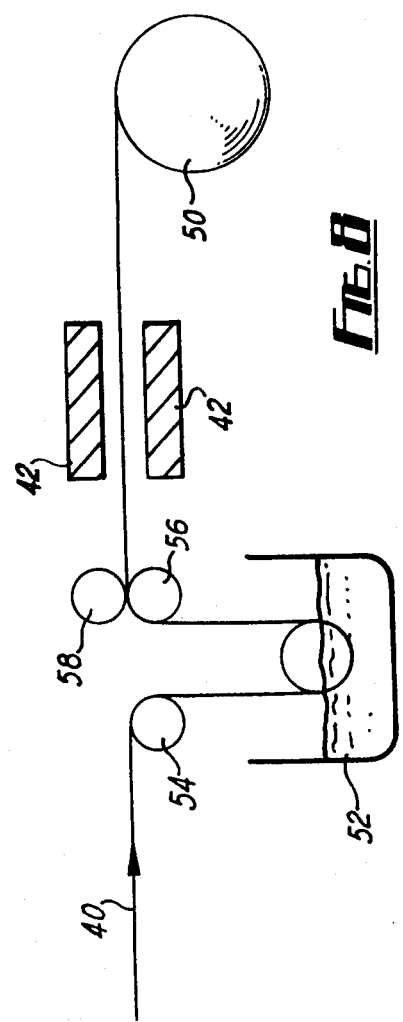

CARBON FIBER COMPOSITES

This invention concerns carbon fibre composites, and processes and apparatus for their manufacture. By "carbon fibre composite" is meant a product comprising a material, especially a synthetic resin, within which carbon fibres are embedded. The function of the resin is primarily to give the composite the required external dimensions and shape, whilst the primary function of the carbon fibres is to provide the required strength.

There are problems associated with the production of carbon fibre composites of other than simple flat plate-like shapes. On the one hand whilst carbon fibre assemblies in the form of felts of random-oriented or aligned short carbon fibres have the necessary drape to allow them readily to be formed into complicated shapes, especially shapes involving curvature in two or more directions, for use in composites, the properties of such a material in certain vital respects, and mainly tensile strength, flexural strength, and modulus are usually found to be unsatisfactory. On the other hand whilst the necessary strength characteristics can be achieved by using arrangements of continuous carbon filaments problems are involved in producing such arrangements which have the necessary handleability and drape for them to be used for making composites of the more complicated shapes already mentioned. Time consuming and expensive methods have hitherto been found necessary in attempts to overcome these difficulties and produce satisfactory load-bearing composites other than of simple flat plate-like shape.

The principal object of the present invention, therefore, is to provide a relatively inexpensive method of producing carbon fibre assemblies having the necessary handleability and drape and the strength characteristics of which are suitable for incorporation in load-bearing composites. The invention is also concerned with the provision of suitable apparatus for carrying out some embodiments of such a method.

This principal object is achieved, according to the present invention, by a method of producing a carbon fibre felt which includes the steps of preparing a substantially unidirectional array of continuous carbonisable filaments in oxydised state, cross-laying other such filaments on one side of said array in a state of restraint from displacement from their cross-laid relationship, and needle-punching the resulting assembly of filaments from the same side. The steps may be repeated to build up greater thickness. The actual direction or directions of cross-laying will depend on the particular strength requirements. The state of restraint of the cross-laid filaments may be arrived at in different ways. For example, the initial array of filaments may be needle-punched from the side opposite to that which will later receive the cross-laid filaments so as to distort the structure of the array by displacing filament elements at the side which is to receive the cross-laid filaments and provide a "keying" structure thereat for the latter. Alternatively, the cross-laid fibres, after placement, may be held in position by an external agency. Both techniques may of course be used together. Needle-punching after cross-laying displaces filament elements, either in the form of loops or broken ends in a direction generally through the thickness of the assembly, and as a result, not only do the displaced elements give the necessary strength in the third dimension, but the assembly is endowed with a surprising degree of cohesion which renders it capable of being continuously and readily handled in subsequent processing without being damaged.

The felt produced according to the present invention will then be carbonized, graphitized, and used to make a composite. However, the felt is of high bulk and low density and when incorporated in a composite it must be very much compacted — as indeed applies to some fibrous assemblies produced by methods other than that according to the invention. The usual procedure in making a composite is to pre-impregnate the basic carbon fibre assembly with a suitable resin prior to final moulding (the resulting product usually being termed a "pre-preg") although it is not unknown to introduce the resin at the time of moulding. In either case the high bulk and low density of the felt can lead to difficulties if conventional procedures are followed. One danger is that if a solvent is used, as it normally is, voids will tend to arise in the felt, and in the finished composite, due to entrapment of solvent. Another is that, on compacting the felt, the excess resin, which because of the open structure must be substantial, tends to displace fibres within the structure or "wash" them away altogether.

A further object of the present invention, therefore, is to avoid these difficulties.

According, then, to another aspect of the invention, a high bulk, low density carbon fibre assembly, especially a carbon fibre felt produced according to the method aforesaid, is impregnated with a thermoplastic or thermosetting resin, highly diluted in a solvent, and the solvent removed either before or whilst the assembly is being reduced to its final dimensions to leave the resin per se as a coating on the fibrous material serving to adhere individual elements together at cross-over points to prevent displacement thereof, all prior to the addition of the matrix material in which the carbon fibre is embedded to form the final composite. The small amount of resin needed does reduce the drape somewhat, and it may be preferable to pre-form the assembly to its final dimensions in a mould of the required finished geometry, especially for parts which have curvature in two directions, or pronounced curvature in one direction. When using a thermoplastic resin it may be preferable, after removal of the solvent, to raise the temperature to the melting point of the thermoplastic to allow it to flow over the fibre surfaces. Polysulphone in 1% – 2% solution in methylene chloride is suitable. If a thermosetting resin is used it is desirable to cure or part cure it during the compacting of the assembly. A 1% – 2% solution of epoxy resin in methylene chloride is suitable. Preferably the solution is applied by dipping or spraying and the vacuum bag method is used to consolidate and pump away solvent.

With the carbon fibre assembly in this state the making of a "pre-preg" may proceed. The composite or matrix resin may be applied, for example, by a doctor knife technique. Alternatively it may be possible in some cases to apply the composite resin at the mould by various techniques including resin injection. In either event the problem of fibre displacement does not arise because of the fibre locking achieved by the use of the first resin.

The invention will now be described further, by way of illustration only, with reference to the accompanying drawings and by the following examples.

In the drawings,

FIG. 1 is a diagram illustrating in side elevation the preparation and needling of a warp sheet of continuous carbon filaments;

FIG. 2 is a diagram illustrating in side elevation the application of a cross-laid sheet of wefts to the warp sheet referred to in connexion with FIG. 1;

FIG. 3 is a diagram illustrating in side elevation the preparation of a multi-layer carbon fibre cross-laid felt;

FIG. 4 is a diagram, illustrating in side elevation a needle-punching mechanism involving control of cross-laid weft;

FIG. 7 is a diagram illustrating the application of resin solution to a felt by spraying, and FIG. 8 is a diagram illustrating the application of a resin solution to a felt by dipping.

Figure 5:
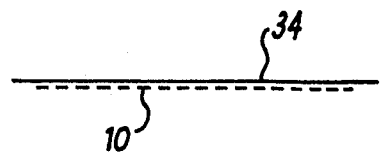
FIG. 5 is a diagram illustrating in side elevation the relative dispositions of a warp sheet and cross-laid weft filaments when employing the mechanism illustrated in FIG. 4.

Referring first to FIG. 1 a warp sheet of continuous carbonisable filaments 10 in oxydised state is travelled from a beam 12 to a needle puncher 14 by means of a feed roller 16 and feed apron 18. The needle puncher 14 has a bed plate 20 and a stripper plate 22. After needle punching the sheet 10 is conveyed by rollers 24, 26, 28 to another warp beam 30.

FIG. 2 illustrates the further processing of the needle punched warp sheet 10 shown in FIG. 1. From the warp beam 30 it is conveyed through the same system, but prior to reaching the needle puncher 14 there is disposed a weft supply package 32 with its axis extending in the same direction as the warp sheet 10, thus enabling the cutting of batches of weft filaments 34 therefrom which are then successively cross-laid on the warp sheet 10. The final assembly is wound up on a beam 36.

FIG. 3 illustrates the building up of a felt of greater thickness in the same apparatus. In this case a beam 36 of felt produced on the apparatus as described with reference to FIG. 2 is disposed so as to feed the felt thereon beneath a needled warp sheet from a beam 30 produced on the apparatus as described with reference to FIG. 1. Again the supply of weft 34 is from package 32.

FIG. 5 illustrates that the cross-laid weft filaments 34 extend beyond the sheet 10 of warp filaments by about one inch at each side in certain embodiments of the method being described.

Figure 6:
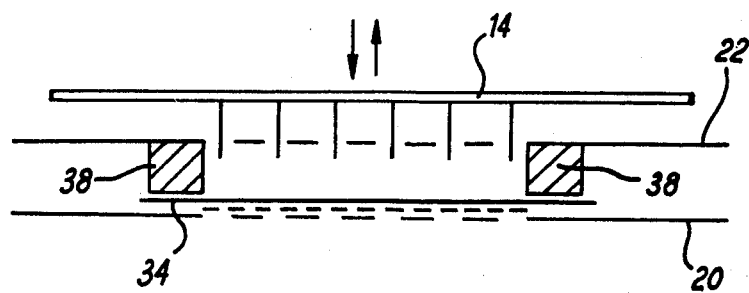
FIG. 6 is a diagram illustrating in more detail and in end elevation the operation of the mechanism of FIG. 4.

FIG. 6 illustrates the provision of resilient pads 38 on the stripper plate 22 adapted to control the weft filaments 34, which have been cross-laid on the warp sheet 10, during needle-punching. Referring to FIGS. 4, 5 and 6, the stripper plate 22 is pivoted at A (FIG.4) and its up and down swinging motion is synchronised with the vertical reciprocating movement of the beam of the needle puncher 14 in such a way that it is in its lowest position when the needles strike the material. At this instant the stripper plate 22 is parallel to the bed plate 20. Both the distance between the two plates and the extent of the swinging motion of the stripper plate 22 are adjustable.

In the preferred method of weft control the weft filaments are cut to about two inches longer than the width of the warp sheet as already explained so that there is a one inch fringe of weft on each side of the warp sheet.

The underside of the stripper plate 22 is fitted with a pair of resilient pads 38, as already described, the thickness of which is slightly greater than the distance between the stripper plate 22 and the bed plate 20. The distance between the two pads 38 is slightly greater than the width of the warp sheet 10 so that with the stripper plate 22 in its lowest position (i.e. with the needles in the material) the pads 38 exert pressure on the fringes of the weft, thus preserving the initial positioning of the weft. The extent of the swing of the stripper plate 22 is adjusted to allow the material to pass freely between the two plates during the advance stage of the cycle, that is during forward movement of the material with both the stripper plate 22 and the needle puncher 14 in their highest positions.

EXAMPLE 1

This example relates to the production of a two-layer 90° cross-laid felt.

Polyacrylonitrile continuous filaments of 1.5 denier and in the form of tows of 10,000 filaments were assembled into a sheet approximately 24 inches wide with 25,000 filaments per inch by the method described in British Patent Specification No. 1,190,214. The filament sheet was then oxydized according to the method and apparatus described in British Patent Specifications No. 1190214 and 1257481. During oxydation the width of the filament sheet was reduced to 18 inches.

The sheet was then pre-needled on the apparatus of FIG. 1 in the manner therein illustrated. The needle-punching machine employed was a Bywater KBN 40 needle-puncher, fitted with 15 × 18 × 36 × 3½ regular barb, standard protrusion needles with a needle density of 25 needles per centimeter width.

This pre-needling operation, to provide a "key" for the weft filaments which were later cross-laid, was carried out with a needle penetration of 13 millimeters and with the warp filament sheet advancing intermittently at a rate of 0.85 centimeters per stroke to give a needling intensity of approximately 30 penetrations per square centimeter. The needle-punching machine speed was 250 strokes per minute.

As will be clear from FIG. 1 the sheet 10 after needling is wound up on the beam 30 with the filament elements which were displaced from the sheet surface outermost.

The next stage, consisting of the cross-laying of weft filaments, was carried out on the same apparatus with the addition of the weft supply package 32 (FIG. 2).

The pre-needled warp sheet was supplied from the beam 30 and advanced intermittently, with the displaced filament elements uppermost, at a rate of 0.65 centimeters per stroke, to give a needling intensity of approximately 40 penetrations per square centimeter. The needle penetration was 14 millimeters.

With the apparatus stationary a length of the weft sheet which is identical to the warp sheet from the package 32 was cut off as it was cross-laid at right angles on the warp sheet. The apparatus was then put into operation, the needle puncher running at 250 strokes per minute, until the next batch of weft filaments could be laid contiguously with the first batch, whereupon the machine was stopped and the entire sequence repeated, and so on.

The resulting felt was wound up on beam 36 with the displaced filament elements resulting from this second needling again outermost. The felt was handleable and had drape characteristics which enabled it readily to be caused to assume shapes of the type previously referred to and yet be capable of giving excellent strength characteristics to the finished composite of which it formed part.

Subsequent processing steps leading up to the formation of a composite will be described later.

EXAMPLE 2

The starting material and the apparatus were the same as in EXAMPLE 1.

A multi-layer felt was produced in the way now described.

First, a felt and a pre-needled warp were produced in the manner set out in EXAMPLE 1. Then as shown in FIG. 3. the beam 36 carrying the felt was supported beneath the apparatus and fed beneath the pre-needled warp from beam 30. The weft sheet of the felt was uppermost, and the displaced filament elements of the pre-needled warp were also uppermost. The combined felt and warp were cross-laid with weft 34 from the package 32 as before and needled, the needle penetration being reduced to 11 millimeters. The resulting four-layer felt was then wound up on a beam (not shown in FIG. 3).

Again a satisfactory result was achieved, the felt, however, being thicker than that of EXAMPLE 1.

EXAMPLE 3.

In this case a multi-layer felt with cross-laid weft at different angles was produced.

Again the starting material and the apparatus used was as described in EXAMPLE 1.

The procedure was exactly as in EXAMPLE 2 except that the first felt had weft cross-laid at an angle of 45° in one direction to the warp filaments, whilst the final weft was cross-laid at an angle of 45° in the other direction to the warp filaments.

The resulting felt was again quite satisfactory from a drape point of view but imparted strength to the composite principally in four rather than three directions because of the two differently angled wefts.

EXAMPLES 4, 5 and 6

These examples involved repeating the steps of EXAMPLES 1, 2 and 3 except that the apparatus incorporated the modified needle punching machine already described in connexion with FIG. 4 to 6 and that the weft was cut oversize as already described in connexion with, and illustrated, in FIGS. 5 and 6.

The resulting felts were again very acceptable, but because of the additional weft restraint imposed the physical properties in the warp and weft directions were more nearly the same. This additional restraint restricts further the displacement of weft filaments during needling.

EXAMPLES 7, 8 and 9

These examples involved repeating the steps of EXAMPLES 4, 5 and 6 except that in no case was a pre-needled warp used. In other words the part of the process generally illustrated in FIG. 1 was omitted.

Again very satisfactory felts were produced, and, compared with EXAMPLES 1, 2 and 3, the physical characteristics in warp and weft directions were again more nearly the same, this because of the fact that weft restraint was more positive.

As has already been mentioned it is beneficial to apply resin to the felt in a certain manner, after carbonisation and graphitization, but before making a "pre-preg" or final moulding of the composite. This applies equally to all felts of high bulk and low density, whether made in accordance with the processes described in this specification or otherwise, and for the reasons already stated. For convenience, and to distinguish from pre-impregnation proper, this step will be referred to as pre-sizing.

Pre-sizing may be carried out as shown in FIGS. 7 and 8. In FIG. 7 the felt 40 is travelled beneath spray means through an oven 42, the spray means comprising a reservoir 44, a metering pump 46 and a reciprocating nozzle 48. The felt 40 finally passes to a wind up or a mould 50. In FIG. 8 the felt 40 goes through a dipping bath 52, being guided by rolls 54, 56, 58, and oven 42 and to a wind-up or mould 50. Rolls 56, 58 also act as nip rolls to remove excess size.

One of the conventional procedures which can lead to difficulties when high bulk low density felts are being incorporated into composites is hot high pressure matched die moulding. In this procedure there is usually considerable resin flow and therefore danger of filament displacement. A felt produced according to the present invention (e.g. a felt of one of the preceding examples) has a good degree of cohesion but further locking of the filaments can be obtained by pre-sizing of the felt with a solution of a thermoplastic resin, for example polysulphone or polycarbonate in 1% solution in methylene chloride, which is compatible with the matrix resin of the composite. Thus the two solutions mentioned would be satisfactory when the matrix resin would be, say, polyester epoxy polyimide.

The pre-sizing can be carried out on either the spray apparatus of FIG. 7 or the dipping apparatus of FIG. 8 After removal of the solvent in the oven 42 the remaining resin adheres the filaments together at cross-over points thus providing additional locking of the filaments. The so-treated felt can then be impregnated with suitable resin by any of the usual process to form a "pre-preg" — e.g. resin bath, hot melt, or doctor knife. On moulding no unacceptable disturbance of the felt filaments occurs.

If it is intended to mould thick sections the felt, after size application, passes to a mould rather than a take-up, and whilst still wet, and compressed to squeeze out excess size and solvent. Low heat is applied to help remove the solvent. The felt retains the compressed dimensions, and may then be impregnated with low viscosity resins and moulded in the matched die moulds.

Another conventional moulding procedure which benefits from the use of felts prepared according to the invention is injection moulding using felts with a high volume fraction of fibre. Thus a felt produced according to one of the preceding examples may be pre-sized with a thermoplastic resin in solvent azoic 1% solution, placed in the injection mould and compressed to normal component size under moderate heat (100°C say) and 50 lbs. per square inch pressure. Vacuum is applied to assist solvent removal. This pre-formed felt is then satisfactorily resin injected under the application of vacuum and pressure and cured by heat.

Another advantageous use for felts according to the invention is in the production of carbon - carbon composites. This is because of their stable and very porous nature. Thus a felt of one of the preceding examples may be impregnated with a suitable epoxy resin and subjected to high temperature treatment to convert the resin to carbon material. The carbon matrix could also be deposited by the chemical vapour deposition method.

We claim:

1. A method of producing a composite shaped article comprising the steps of
preparing a high bulk, low density felt from continuous carbonisable filaments in oxidised state and with fibrous elements lying in cross-over relationship in at least two directions along the length of the felt and also through the thickness of the felt;
carbonising said high bulk, low density felt;
pre-sizing said felt by impregnating it whilst still in its high bulk low density state, with a thermosensitive resin highly diluted in a solvent, removing said solvent to leave said resin substantially solely as a coating on said fibrous elements, and converting said resin to a state in which it locks said fibrous elements together by adhesion at the cross-over locations;
applying further resin to the pre-sized felt to occupy the voids between the adhered fibrous elements, and forming the composite article by converting it into an assembly consisting of a contoured reinforcement constituted by said fibrous elements in a permanent matrix constituted from said resin.

2. A method as set forth in claim 1 comprising the further steps of compressing and shaping said felt whilst removing said solvent.

3. A method as set forth in claim 1 in which said further resin is applied to form a pre-preg.

4. A method as set forth in claim 1 in which said further resin is applied as part of a final stage comprising shaping of the composite article and conversion of the resin to the permanent matrix.

5. A method as claimed in claim 1 comprising the further step of raising the temperature of the resin following removal of said solvent to encourage flow thereof over the surface of the fibrous elements.

* * * * *